Sept. 13, 1932.　　　C. P. KOTTLOWSKI　　　1,877,338
CHAIN DRIVE
Filed Oct. 23, 1929
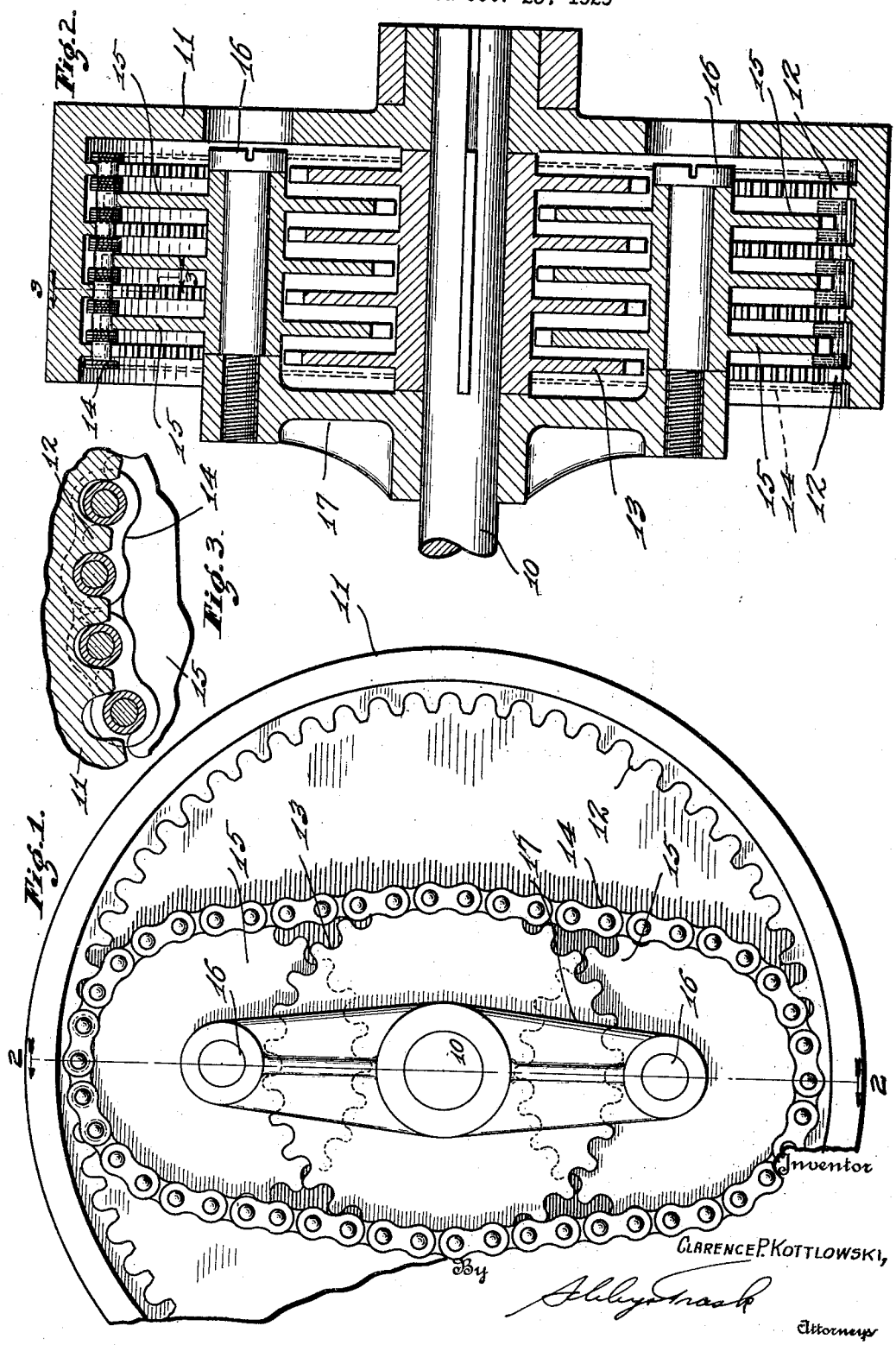

Patented Sept. 13, 1932

1,877,338

UNITED STATES PATENT OFFICE

CLARENCE P. KOTTLOWSKI, OF INDIANAPOLIS, INDIANA, ASSIGNOR TO DIAMOND CHAIN AND MANUFACTURING COMPANY, OF INDIANAPOLIS, INDIANA, A CORPORATION OF INDIANA

CHAIN DRIVE

Application filed October 23, 1929. Serial No. 401,906.

It is the object of my invention to produce a power-transmitting drive which will be a more compact installation and more flexible in operation than other type of drives of which I am aware.

The accompanying drawing illustrates my invention: Fig. 1 is an end elevation of a device embodying my drive; Fig. 2 is a longitudinal section through the device on the line 2—2 of Fig. 1; and Fig. 3 is a fragmental section on the line 3—3 of Fig. 2.

Broadly considered, my invention contemplates two relatively rotatable members operatively interconnected by means of a chain, the chain engaging one of such members through an internal series of teeth on that member. In the device illustrated in the drawing such two members are a driving member in the form of a shaft 10 and a driven member in the form of a drum 11 co-axial with such shaft. It is not necessary that the two members be co-axial, nor is it necessary that the shaft be the driving member and the drum the driven member.

The drum 11 is provided internally with one or more annular series of teeth 12, there being four such series of teeth in the device shown in the drawing. Rotatable with the shaft 10, there are chain sprockets 13 corresponding in number to the number of series of teeth 12. The sprockets 13 and the drum 11 are operatively interconnected by a chain 14 which engages the sprockets 13 for a portion of their circumference and is held in mesh with the teeth 12 on the drum 11 by some suitable means, a particular form of which will be described in detail hereafter.

The chain illustrated in the drawing is a multiple chain of the roller type, but it may be any other type of power-transmitting chain. It will be understood that if there is but one sprocket 13 and one series of teeth 12 the chain 14 need not be of the multiple type. If there are a plurality of sprockets 13 and a plurality of series of teeth 12, there may be a single chain of the multiple type as shown in the drawing, or individual chains may interconnect each sprocket 13 with its corresponding series of teeth 12 on the drum 11.

The means shown in the drawing for holding the chain 14 in engagement with the internal teeth 12 of the drum 11 comprises a series of auxiliary sprockets 15 which are rotatably mounted as on a stud 16 carried in some convenient manner from a support 17, which is a stationary support in the device illustrated.

As previously stated the device illustrated in the drawing embodies four series of internal teeth 12 on the drum 11 and, correspondingly, four sprockets 13. The chain 14 is a seven-strand chain, alternate strands of which co-operate with the sprockets 13 and teeth 12. The other strands of the chain 14 are engaged by the sprockets 15, which serve to hold the chain in engagement with the teeth 12.

The chain 14 may engage the teeth on the drum 11 at one or more points on the circumference of the drum. As shown in the drawing, the chain engages the teeth 12 at two diametrically opposite points, and there are therefore provided two sets of auxiliary sprockets 15 and two supporting studs 16.

The operation of the device will be evident. As the driving shaft 10 rotates, it carries the sprockets 13 with it, and rotation of the sprockets 13 causes movement of the chain 14. As the chain 14 is held in engagement with the teeth 12 on the drum 11 by means of the sprockets 15, movement of the chain causes rotation of the drum.

My drive can be used much more flexibly than can other types of power transmission, as the distance between the axes of the driving and driven members is wholly independent of the speed-ratio effected.

I claim as my invention:

1. A power-transmitting drive, comprising two members relatively rotatable on parallel axes, one of said members being provided with a plurality of circumferential series of internal sprocket teeth and the other of said members being provided with a plurality of circumferential series of external sprocket teeth respectively co-planar with the series of internal teeth, a multiple chain operatively interconnecting said two members through their respective series of teeth, alternate strands of said chain engaging said internal and external teeth, and one or more auxiliary sprockets engaging some or all of the remaining strands of said chain, said auxiliary sprockets being rotatable about an axis parallel to the axes of the driving and driven members for holding the chain in engagement with said internal series of teeth.

2. A power-transmitting drive, comprising driving and driven members, one of said members being provided with a plurality of circumferential series of internal sprocket teeth and the other of said members being provided with a plurality of circumferential series of external sprocket teeth, a multiple chain operatively interconnecting said two members through their respective series of teeth, said multiple chain having a greater number of strands than there are series of internal teeth, and one or more rotatable auxiliary sprockets for holding said chain in engagement with said internal teeth, said auxiliary sprocket or sprockets co-operating with one or more of those strands of said chain which do not engage said internal teeth.

3. In a chain drive, a multiple-strand chain, a member having one or more circumferential series of internal sprocket teeth meshing with less than all the strands of said chain, and one or more auxiliary sprockets for holding said chain in engagement with said internal teeth, said auxiliary sprocket or sprockets meshing with one or more of those strands of said chain which do not engage said internal teeth.

In witness whereof, I have hereunto set my hand at Indianapolis, Indiana, this 19th day of October, A. D. one thousand nine hundred and twenty nine.

CLARENCE P. KOTTLOWSKI.